United States Patent
Li et al.

(10) Patent No.: US 8,143,862 B2
(45) Date of Patent: Mar. 27, 2012

(54) CIRCUITS AND METHODS FOR BATTERY CHARGING

(75) Inventors: Guo Xing Li, Sunnyvale, CA (US); Jiankui Guo, Shenzhen (CN); Xin Dong, Shenzhen (CN); Songtao Chen, Shenzhen (CN); Ruichao Tang, Shenzhen (CN); Chutao Zheng, Shenzhen (CN); Celin He, Shenzhen (CN)

(73) Assignee: 02Micro Inc., Santa Clara, CA (US)

( * ) Notice: Subject to any disclaimer, the term of this patent is extended or adjusted under 35 U.S.C. 154(b) by 455 days.

(21) Appl. No.: 12/402,734

(22) Filed: Mar. 12, 2009

(65) Prior Publication Data

US 2010/0231174 A1 Sep. 16, 2010

(51) Int. Cl.
*H02J 7/04* (2006.01)
(52) U.S. Cl. ........................................................ 320/145
(58) Field of Classification Search .................... 320/145
See application file for complete search history.

(56) References Cited

U.S. PATENT DOCUMENTS

| | | | |
|---|---|---|---|
| 6,329,796 B1* | 12/2001 | Popescu | 320/134 |
| 2005/0254273 A1* | 11/2005 | Soudier et al. | 363/103 |
| 2006/0022214 A1* | 2/2006 | Morgan et al. | 257/99 |
| 2008/0197811 A1* | 8/2008 | Hartular et al. | 320/141 |
| 2008/0285317 A1* | 11/2008 | Rotzoll | 363/80 |

* cited by examiner

*Primary Examiner* — M'Baye Diao

(57) ABSTRACT

A circuit for charging a battery pack includes a power converter and a charger controller. The power converter is operable for receiving an input power, and for providing a charging power for charging the battery pack. The power converter provides galvanic isolation between input circuitry and output circuitry of the circuit. The input circuitry shares a first ground potential with the input power, and the output circuitry shares a second ground potential with the charging power. The charger controller in the input circuitry includes a modulator for generating a driving signal to drive the power converter and control the charging power.

20 Claims, 5 Drawing Sheets

CIRCUITS AND METHODS FOR BATTERY CHARGING

BACKGROUND

FIG. 1 shows a block diagram of a conventional battery charging circuit 100. The battery charging circuit 100 includes an alternating current (AC) power source 106, an input rectifier circuitry 110, a flyback converter 112, a pulse width modulation (PWM) controller 114, an isolated converter 116, sensing circuitry 118, a microcontroller (MCU) 120, a control switch 130 and a battery pack 108. The flyback converter 112 includes a main transformer which provides galvanic isolation between input circuitry 102 and output circuitry 104. The flyback converter 112 is operable for receiving a driving signal 140, e.g., a pulse width modulation signal, and for providing a direct current (DC) charging power to the battery pack 108 via the control switch 130. The PWM controller 114 in the input circuitry 102 is operable for generating the driving signal 140 for driving the flyback converter 112. The sensing circuitry 118 can monitor a charging current and a charging voltage, and can feed back information about the charging current and the charging voltage to the PWM controller 114 via the isolated converter 116, e.g., an optocoupler. The microcontroller 120 can monitor the status of the battery pack 108 and can feed back an alert signal to the PWM controller 114 if the battery pack undergoes an undesirable or abnormal condition (e.g., over-current, over-voltage, etc.). The PWM controller 114 can further receive feedback information (e.g., information about charging current and charging voltage, the alert signal, etc.), and can adjust the driving signal 140 to control the charging power according to the feedback information.

Thus, the PWM controller 114 can directly monitor and control an input peak current of the main transformer, such that the main transformer saturation problem can be avoided. However, for purposes of galvanic isolation, the feedback information from the output circuitry 104 may only be transferred by the isolated converter 116, e.g., an optocoupler, which may decrease the accuracy of the feedback information. In addition, the PWM controller 114, the isolated converter 116, the sensing circuitry 118 and the MCU 120 may increase the cost and complexity of the battery charging circuit 100.

SUMMARY

In one embodiment, a circuit for charging a battery pack includes a power converter and a charger controller. The power converter is operable for receiving an input power, and for providing a charging power for charging the battery pack. The power converter provides galvanic isolation between input circuitry and output circuitry of the circuit. The input circuitry shares a first ground potential with the input power, and the output circuitry shares a second ground potential with the charging power. The charger controller in the output circuitry includes a modulator for generating a driving signal to drive the power converter and control the charging power.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
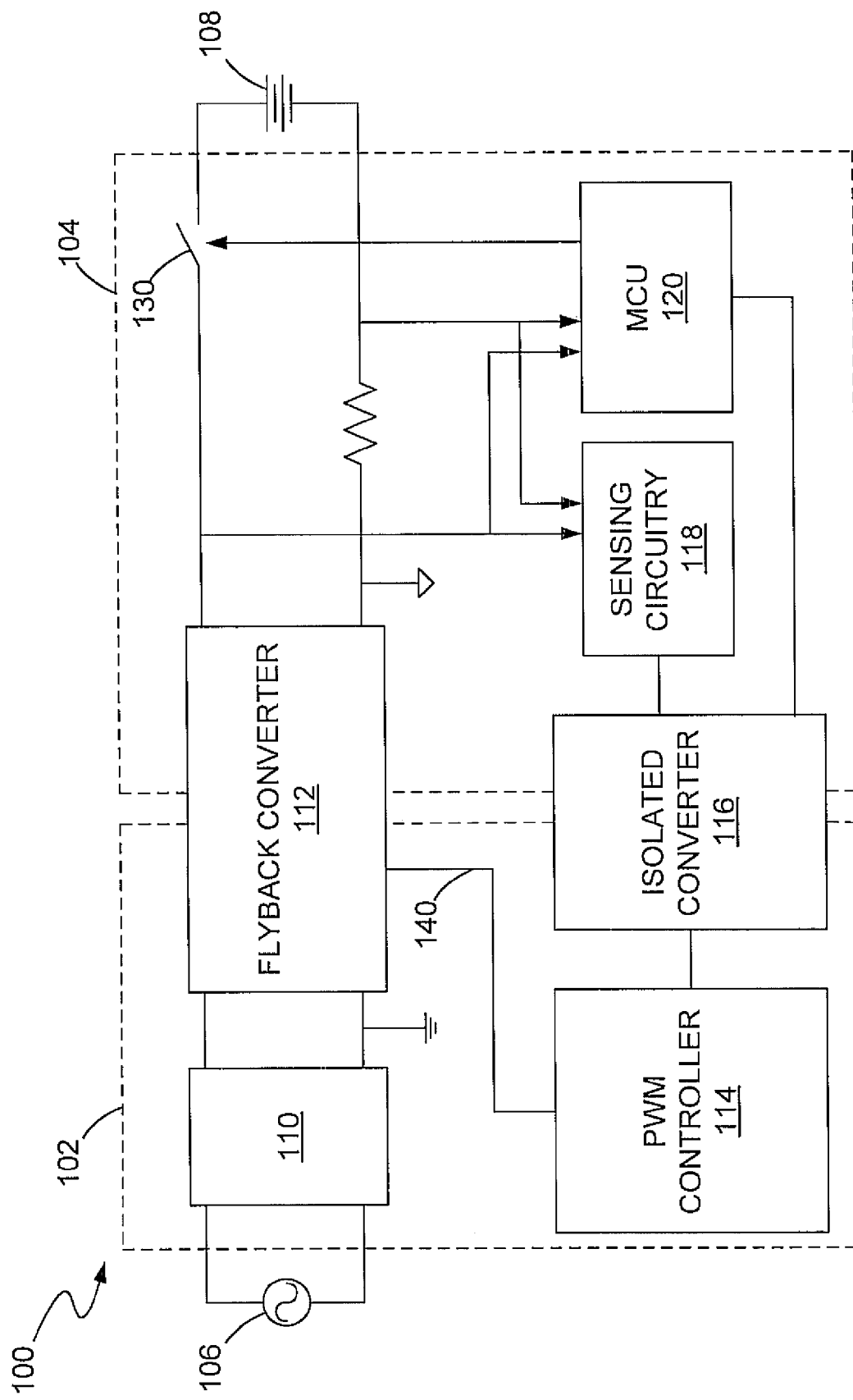
FIG. 1 shows a block diagram of a conventional battery charging circuit.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "receiving," "generating," "providing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provide a battery charging circuit. Advantageously, the charger controller in the output circuitry of the battery charging circuit can sense the charging voltage signal, the charging current signal and the battery status signals directly to enhance the accuracy of the charging system. Moreover, the pulse width modulator, the state machine, and the protection circuitry can be integrated on an integrated circuit chip to reduce the cost. Advantageously, the state machine can store predetermined charging statuses which can be used to identify that the transformer in the battery charging circuit is experiencing a saturation issue, and can control the battery charging circuit in a protection mode to avoid the saturation issue if the status of the battery pack matches one of the predetermined charging statuses.

Figure 2:
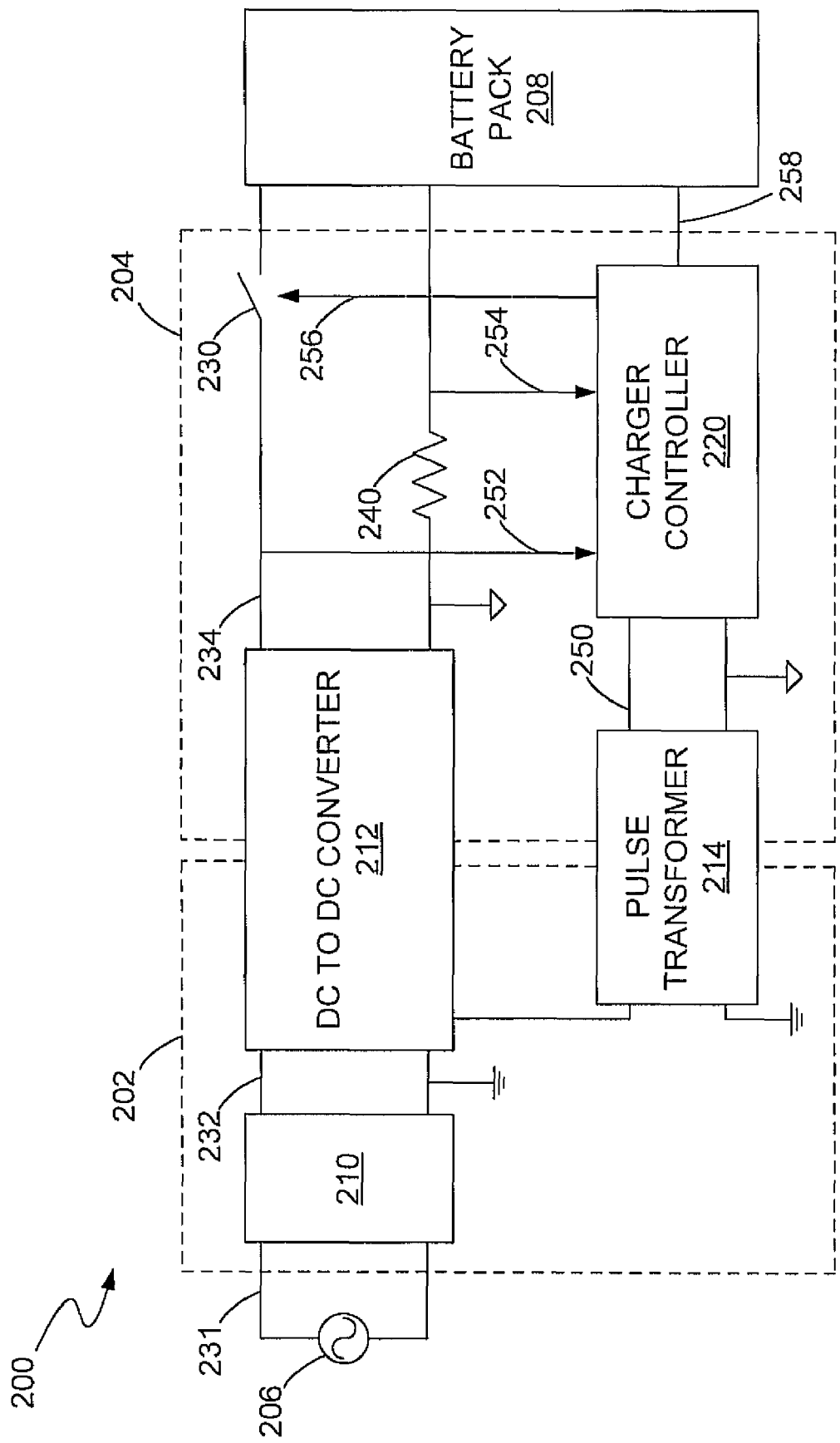
FIG. 2 illustrates a block diagram of a battery charging circuit, in accordance with one embodiment of the present invention.

FIG. 2 illustrates a block diagram of a battery charging circuit 200, in accordance with one embodiment of the present invention. In the example of FIG. 2, the battery charging circuit 200 includes an alternating current (AC) power source 206, input rectifier circuitry 210, a DC to DC converter 212, a switch 230, a current sensing resistor 240 and a battery pack 208.

The AC power source 210 can provide an AC electrical power 231 (e.g., a 120 volt commercial power supply in the United States). In one embodiment, the input rectifier circuitry 210 can include, but is not limited to, a rectifier and a filter, and can convert the AC electrical power 231 to a DC electrical power 232. The rectifier can include, but is not limited to, a half-wave rectifier, a full-wave rectifier or a bridge rectifier. The DC to DC converter 212 is operable for receiving the DC electrical power 232 and for providing a DC charging power 234 to the battery pack 208. As such, the input rectifier circuitry 210 and the DC to DC converter 212 can constitute an AC to DC converter. The switch 230 coupled between the DC to DC converter 212 and the battery pack 208 is operable for transferring the charging power 234 to the battery pack 208 according to a switch controlling signal 256.

In one embodiment, the DC to DC converter 212 can include a flyback DC to DC converter which provides galvanic isolation between input circuitry 202 and output circuitry 204. As described in the present disclosure, the term "input circuitry" can represent the circuit components and connections having a common ground potential with the input power supply (e.g., the DC electrical power 232), and "output circuitry" can represent the circuit components and connections having a common ground potential with the output charging power (e.g., the charging power 234). Therefore, communications between the input circuitry 202 and the output circuitry 204 may rely on non-electric media, e.g., electromagnetic media (e.g., a transformer), or photoelectric media (e.g., an optocoupler), etc.

The battery charging circuit 200 can further include a charger controller 220 and a pulse transformer 214. The charger controller 220 in the output circuitry 204 can generate a driving signal 250 for driving the DC to DC converter 212. The pulse transformer 214 can transfer the driving signal 250 from the output circuitry 204 to the input circuitry 202.

In one embodiment, the charger controller 220 is further operable for monitoring a status of the battery pack 208 and for controlling the charging power 234 according to the battery status. Advantageously, the charger controller 220 can include a plurality of interfaces coupled between the charger controller 220 and the battery pack 208, and is operable for receiving a plurality of status signals 258 indicative of the status of the battery pack 208. The status signals 258 can include, but are not limited to, a battery type signal, a cell number signal, a battery temperature signal, a cell voltage signal, etc. Moreover, the charger controller 220 can receive a plurality of charging sensing signals, e.g., a charging current signal 254 indicative of a charging current of the battery pack 208, generated by the current sensing resistor 240, a charging voltage signal 252 indicative of a charging voltage of the battery pack 208, etc.

In one embodiment, the charger controller 220 can determine a charging mode for charging the battery pack 208 according to the charging voltage signal 252, the charging current signal 254 and the status signals 258. Subsequently, the charger controller 220 can generate a switch controlling signal 256 for controlling the switch 230 and for adjusting the driving signal 250 to control the charging power 234 delivered from the input circuitry 202 to the battery pack 208. Advantageously, instead of transferring a plurality of feedback signals, e.g., the charging voltage and the charging current, from the output circuitry to the input circuitry via an isolated converter (e.g., the isolated converter 116 of FIG. 1), the charger controller 220 of the output circuitry 204 can sense these charging signals (e.g., the charging voltage signal 252, the charging current signal 254 and the status signals 258) directly to enhance the accuracy of the charging system.

Advantageously, the charger controller 220 can be integrated on an integrated circuit chip to reduce the cost.

Figure 3:
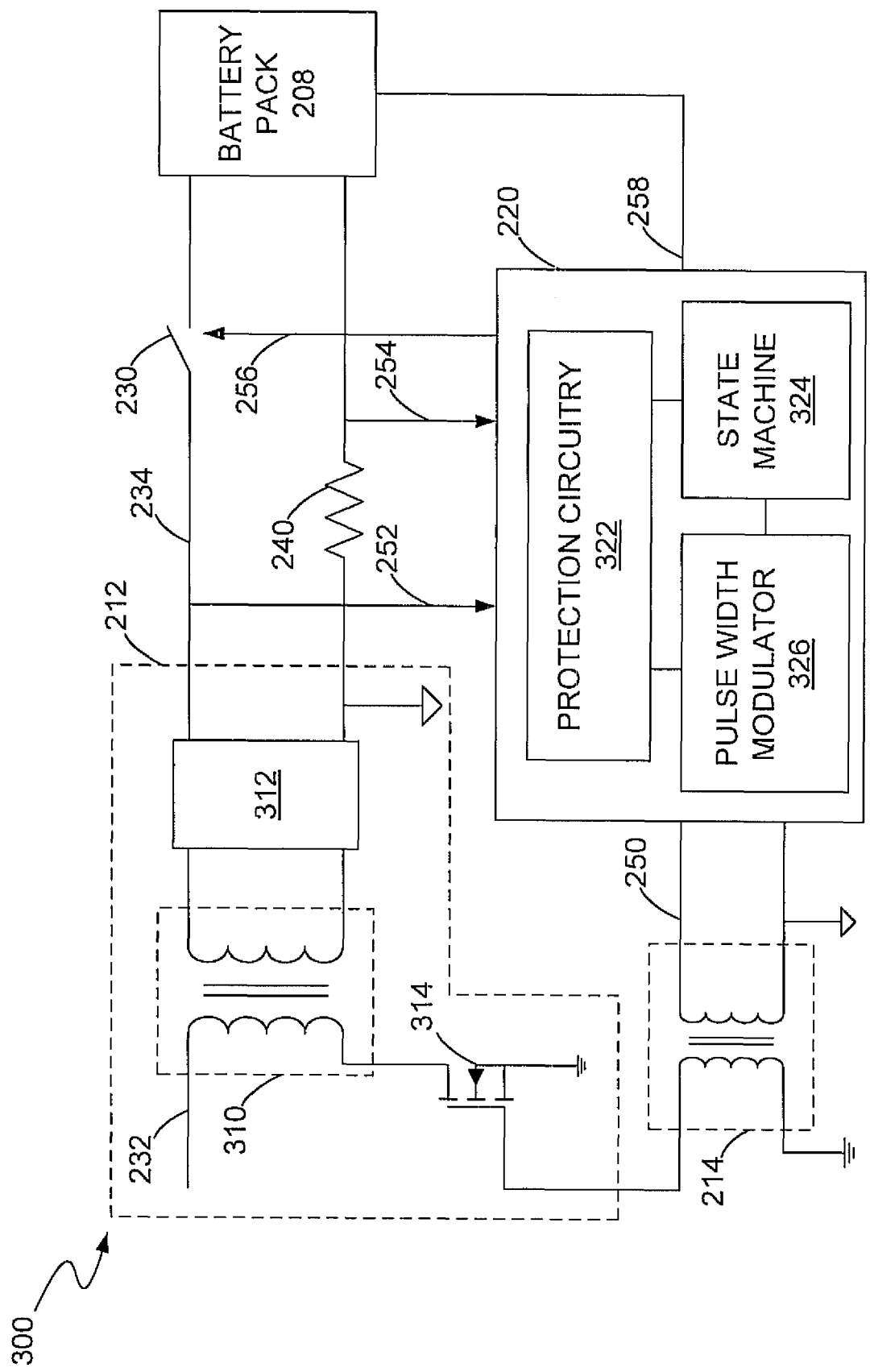
FIG. 3 illustrates a schematic diagram of a battery charging circuit, in accordance with one embodiment of the present invention.

FIG. 3 illustrates a schematic diagram of a battery charging circuit 300, in accordance with one embodiment of the present invention. Elements labeled the same as in FIG. 2 have similar functions. In the example of FIG. 3, the battery charging circuit 300 can include a DC to DC converter 212, a pulse transformer 214, a switch 230, a charger controller 220, a current sensing resistor 240 and a battery pack 208. The battery charging circuit 300 can receive the DC electrical power 232 and can convert the DC electrical power 232 to a DC charging power 234 for charging the battery pack 208.

In one embodiment, the DC to DC converter 212 can include a main transformer 310, output rectifier circuitry 312 and a control switch 314. The main transformer 310 (e.g., a flyback transformer) provides galvanic isolation between the primary coil and the secondary coil of the main transformer 310, and is operable for transferring the electrical power from the primary coil to the secondary coil through a magnetic field. Meanwhile, the voltage level of the electrical power can be stepped down to a proper value (e.g., a 4.2 volt charging voltage for charging a single lithium battery cell) for charging the battery pack 208. The output rectifier circuitry 312 coupled to the secondary coil of the main transformer 310 is operable for providing the charging power 234 with a DC voltage level.

The charging power 234 can be controlled by the control switch 314 coupled to the primary coil of the main transformer 310. More specifically, the driving signal 250 can be a pulse width modulation (PWM) signal, in one embodiment. If the driving signal 250 is high, the control switch 314 can be switched on. Thus, the primary coil of the main transformer 310 can be coupled to the DC electrical power supply 232, such that the energy from the DC electrical power supply 232 can be stored in the main transformer 310. If the driving signal 250 is low, the control switch 314 can be switched off. During this time period, the energy stored in the main transformer 310 can be transferred to the output of the DC to DC converter 212. Therefore, the charging power 234 can be controlled by adjusting the duty cycle of the driving signal 250, in one embodiment. The DC to DC converter 212 can have many other configurations, and is not limited to the configuration in the example of FIG. 3.

In one embodiment, the pulse transformer 214 coupled between the control switch 314 and the charger controller 220 can transfer the driving signal 250, e.g., a digital pulse width modulation signal, from the charger controller 220 to the control switch 314. However, the pulse transformer 214 can be replaced by other components such as an optocoupler, and is not limited to the example in FIG. 3.

In one embodiment, the charger controller 220 includes protection circuitry 322, a state machine 324 and a pulse width modulator 326. The protection circuitry 322 is operable for monitoring a status of the battery pack 208, and for generating an alert signal if the battery pack 208 undergoes an undesirable or abnormal condition. The alert signal can be received by the state machine 324 and the pulse width modulator 326. The undesirable or abnormal condition can include, but is not limited to, over-current (OC), short circuit (SC), over-voltage (OV), over-temperature (OT), under-temperature (UT), etc.

More specifically, the protection circuitry 322 can receive and analyze the monitoring signals such as charging voltage signal 252, the charging current signal 254 and the battery status signals 258, and can determine whether the battery pack 208 is in an undesirable or abnormal condition accordingly, in one embodiment. For example, the protection circuitry 322 can store a plurality of predetermined thresholds, such as over-temperature threshold, under-temperature threshold, over-voltage threshold, over-current threshold, etc., and can compare the monitoring signals with a corresponding predetermined threshold. The alert signals can be generated if a result of the comparison indicates that an undesirable or abnormal condition occurs, e.g., when a temperature of the battery pack 208 exceeds a predetermined over-temperature threshold. In one embodiment, the thresholds in the protection circuitry 322 can be predetermined or programmed by users.

The state machine 324 can include, but is not limited to, a logic circuit or a plurality of operation programs executed by a microcontroller. The state machine 324 is operable for monitoring a status of the battery pack 208, and for selecting a charging mode for the battery pack 208 according to the battery status. The charging modes can constant current (CC) charging, constant voltage (CV) charging, end of charging (EOC), floating charging (FC), etc. In one embodiment, the charging modes stored in the state machine 324 can be predetermined or programmed by users.

In one embodiment, the state machine 324 can receive the charging voltage signal 252, the charging current signal 254 and the battery status signals 258, and can select a charging mode suitable for the battery pack 208 accordingly, as will be discussed more in detail in relation to FIG. 4. Consequently, the state machine 324 can generate a plurality of charging management signals which can be received by the pulse width modulator 326, and can further generate a switch controlling signal 256 to control the switch 230, in one embodiment.

Furthermore, the state machine 324 can receive the alert signal from the protection circuitry 322 and can generate a charging management signal to switch the charging mode of the battery pack 208 to a protection mode accordingly, in one embodiment. During the protection mode, the charging process can be terminated or a relatively small amount of charging power can be delivered to the battery pack 208.

Advantageously, the state machine 324 can store predetermined charging statuses associated with events such as sudden removal of the battery pack, an abnormal condition, etc., which may cause saturation of the transformer, e.g., the main transformer 310. Thus, if the status of battery charging circuit 300 matches one of the predetermined charging statuses, the charging mode of the battery charging circuit 300 can be switched to the protection mode to avoid the saturation issue.

The pulse width modulator 326 is operable for generating a driving signal 250 for driving the DC to DC converter 212. In one embodiment, the driving signal 250 can be, but is not limited to, a pulse width modulation signal, such that the duty cycle of the driving signal 250 can be adjusted to control the charging power 234, as discussed in relation to FIG. 3. In one embodiment, the pulse width modulator 326 is capable of receiving the charging management signals from the state machine 324 and adjusting the driving signal 250 to control the charging power 234 according to the charging management signals. Moreover, the pulse width modulator 326 is capable of receiving the alert signal from the protection circuitry 322 and adjusting the driving signal 250 to limit the charging power for the battery pack 208 according to the alert signals, e.g., to terminate the charging power or supply a relatively small amount of charging power to the battery pack 208.

Figure 4:
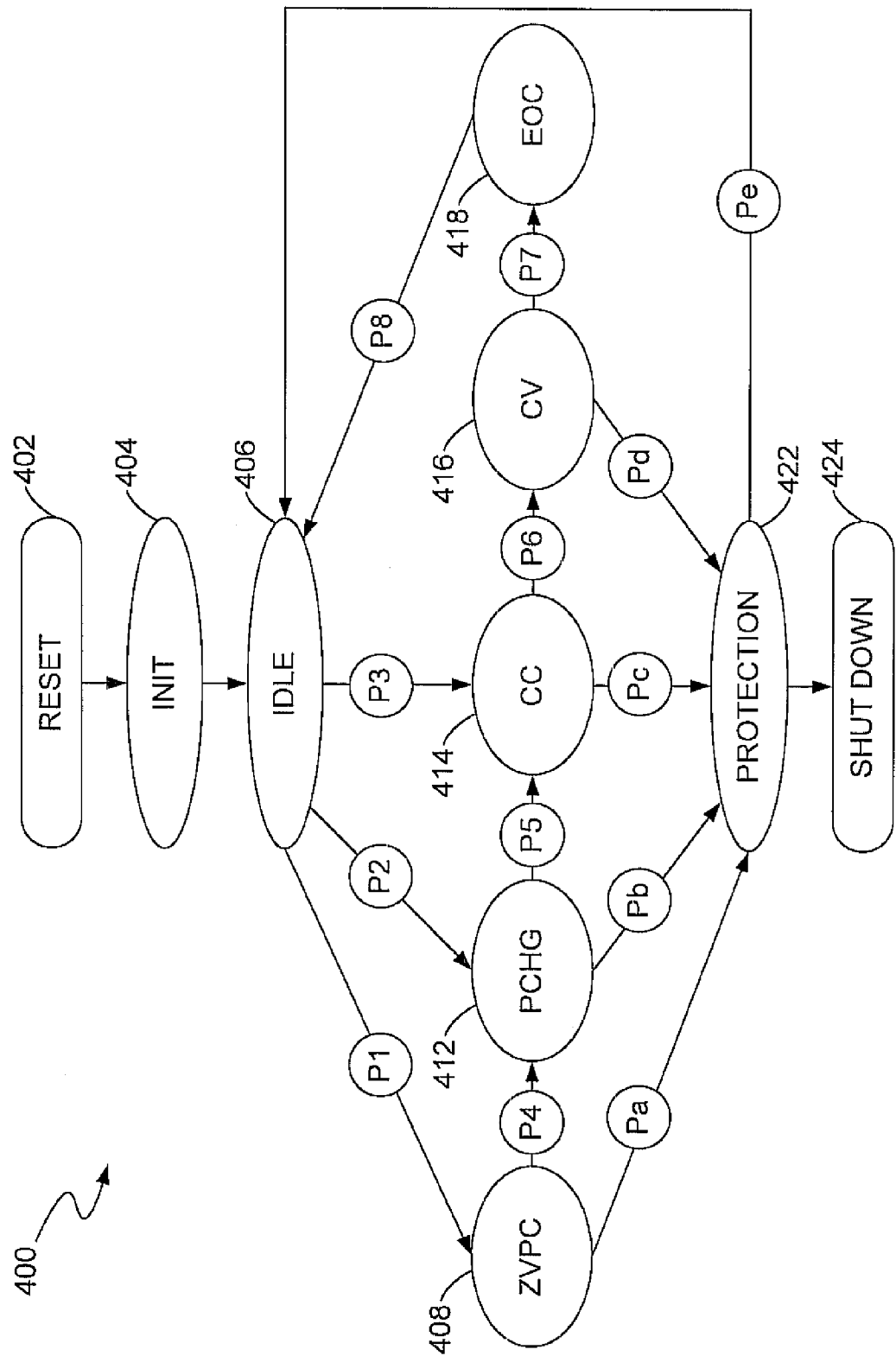
FIG. 4 illustrates a diagram of a state flowchart that may employed by a state machine, in accordance with one embodiment of the present invention.

FIG. 4 illustrates an example of a state flowchart 400 that may be employed by the state machine of FIG. 3, in accordance with one embodiment of the present invention. FIG. 4 is described in combination with FIG. 2 and FIG. 3.

In one embodiment, the state machine 324 can store a plurality of data indicative of different charging modes and mode transitions. In one embodiment, the state machine 324 can monitor the status of the battery pack 208, and can determine a charging mode suitable for the battery pack 208 accordingly. Subsequently, the state machine 324 can generate a switch controlling signal 256 to control the switch 230 and generate a plurality of charging management signals to control the pulse width modulator 326, thus controlling the charging power delivered to the battery pack 208. More specifically, the switch 230 can receive the switch controlling signal 256, and can enable or disable the charging power 234 for the battery pack 208 according to the switch controlling signal 256. The pulse width modulator 326 can receive the plurality of charging management signals, and can adjust the driving signal 250 to drive the DC to DC converter 212 so as to control the charging power 234.

In one embodiment, the state machine 324 can receive an alert signal from the protection circuitry 322, and can switch the charging mode to a protection mode, in which the charging power for the battery pack 208 is limited, if the battery pack 208 is in an undesirable or abnormal condition. In one embodiment, the state machine 324 can store predetermined charging statuses which can be used to identify that the main transformer 310 is experiencing a saturation issue, and can switch the charging mode to the protection mode to avoid the saturation issue if the status of the battery charging circuit 300 matches one of the predetermined charging statuses.

In the example of FIG. 4, charging modes in the state machine can include, for example, an initialization (INIT) mode, an idle (IDLE) mode, a zero voltage pulse charging (ZVPC) mode, a pre-charging (PCHG) mode, a constant current (CC) mode, a constant voltage (CV) mode, an end of charging (EOC) mode and a protection mode. In the INIT mode, the battery charging circuit 300 is initialized, e.g., the charging power delivered to the battery pack 208 is limited to a predetermined level. In the ZVPC mode, the battery pack 208 is charged by a predetermined pulse charging current, in which the charging voltage is gradually increased. In the PCHG mode, the battery pack is charged by a predetermined continuous charging current with substantially level I1, in which the charging voltage is gradually increased. In the CC mode, the battery pack is charged by a predetermined continuous charging current with substantially level I2 that is greater than I1, in which the charging voltage is gradually increased. In the CV mode, the battery pack is charged by a predetermined constant charging voltage, in which the charging current is gradually decreased. In the EOC mode, the battery charging is terminated and the charging power is limited to a predetermined level. In the protection mode, the charging of the battery pack is temporarily terminated to protect the battery pack and the battery charging circuit.

In block 402, the battery charging circuit 300 is reset. For example, the battery charging circuit 300 is connected to a battery pack 208, e.g., a Li-ion battery cell, and a power source, e.g., an AC power source 210.

In block 404, the state machine 324 enters the INIT mode. After initialization, the state machine 324 goes to the IDLE state in block 406.

In the IDLE mode in block 406, the state machine 324 monitors the status pack 208. In one embodiment, if the battery status meets a predetermined condition P1 (e.g., when the charging voltage signal 252 indicates that an open circuit voltage of a battery cell is less than a predetermined threshold such as level V1), the state machine 324 goes to the ZVPC state in block 408. If the status meets a predetermined condition P2 (e.g., when the charging voltage signal 252 indicates that the open circuit voltage is within a first predetermined range such as level V1 to level V2, where V2 is greater than V1), the state machine 324 goes to the PCHG mode in block 412. If the status meets a predetermined condition P3 (e.g., when the charging voltage signal 252 indicates that the open circuit voltage of a battery cell is within a second predetermined range such as level V2 to level V3, where V3 is greater than V2), the state machine 324 goes to the CC mode in block 414. If the battery status does not meet any condition selected from P1, P2 and P3, or an undesirable or abnormal condition is detected (e.g., an alert signal is received from the protection circuitry 322, or the battery status signals 258 indicates that the battery status matches the predetermined status for the saturation issue), the state machine 324 can stay in the IDLE mode in block 406.

In block 408, the battery pack is charged in the ZVPC mode. Meanwhile, the state machine 324 monitors the status of the battery pack 208. If the status meets a condition P4 (e.g., when the charging voltage signal 252 indicates that the open circuit voltage of a battery cell is equal to the predetermined threshold such as level V1), the state machine 324 goes to the PCHG state in block 412. If the status indicates an undesirable or an abnormal condition Pa (e.g., an alert signal is received from the matches the predetermined status for the saturation issue), the state machine 324 enters the protection state in block 422.

In block 412, the battery pack 208 is charged in the PCHG mode. Meanwhile, the state machine 324 monitors the status of the battery pack 208. If the status meets a condition P5 (e.g., when the charging voltage signal 252 indicates that the open circuit voltage of a battery cell is equal to the predetermined threshold such as level V2), the state machine 324 goes to the CC state in block 414. If the status indicates an undesirable or an abnormal condition Pa (e.g., an alert signal is received from the protection circuitry 322, or the battery status signals 258 indicates that the battery status matches the predetermined status for the saturation issue), the state machine 324 enters the protection state in block 422.

In block 414, the battery pack 208 is charged in the CC mode. Meanwhile, If the status meets a condition P6 (e.g., when the charging voltage signal 252 indicates that the open circuit voltage of a battery cell is equal to the predetermined threshold such as level V3), the state machine 324 goes to the CV state in block 416. If the status indicates an undesirable or an abnormal condition Pc (e.g., an alert signal is received from the protection circuitry 322, or the battery status signals 258 indicates that the battery status matches the predetermined status for the saturation issue), the state machine 324 enters the protection state in block 422.

In block 416, the battery pack 208 is charged in the CV mode. Meanwhile, the state machine 324 monitors the status of the battery pack 208, and goes to the EOC state in block 418 if the status meets a condition P7 (e.g., the charging current signal 254 indicates that the charging current is less than a predetermined minimum level). In addition, the state machine 324 goes to the protection state in block 412 if the status indicates an undesirable or an abnormal condition Pd (e.g., an alert signal is received from the protection circuitry 322, or the battery status signals 258 indicates that the battery status matches the predetermined status for the saturation issue).

In block 418, the charging of the battery pack 208 is terminated. Meanwhile, the state machine 324 monitors the status of the battery pack 208, and returns to the IDLE state in block 406 to start a new cycle if the status meets a condition P8 (e.g., the battery status signals 258 indicate that another battery pack is connected to the battery charging circuit for charging).

In block 422, the battery charging circuit operates in the protection mode. The state machine 324 can further monitor the status of the battery pack 208. If the status meets a condition Pe (e.g., the battery status signals 258 indicate that the status is back to normal in a predetermined time period), the state machine 324 returns to the IDLE mode in block 406 to start a new cycle. Otherwise, the state machine 324 goes to block 424 to shut down the power supply, e.g., the DC electrical power 232, of the battery charging circuit 300.

The state flowchart 400 employed by the charger controller 220 can have many other charging modes and mode transitions, and is not limited to the example in FIG. 4.

Figure 5:
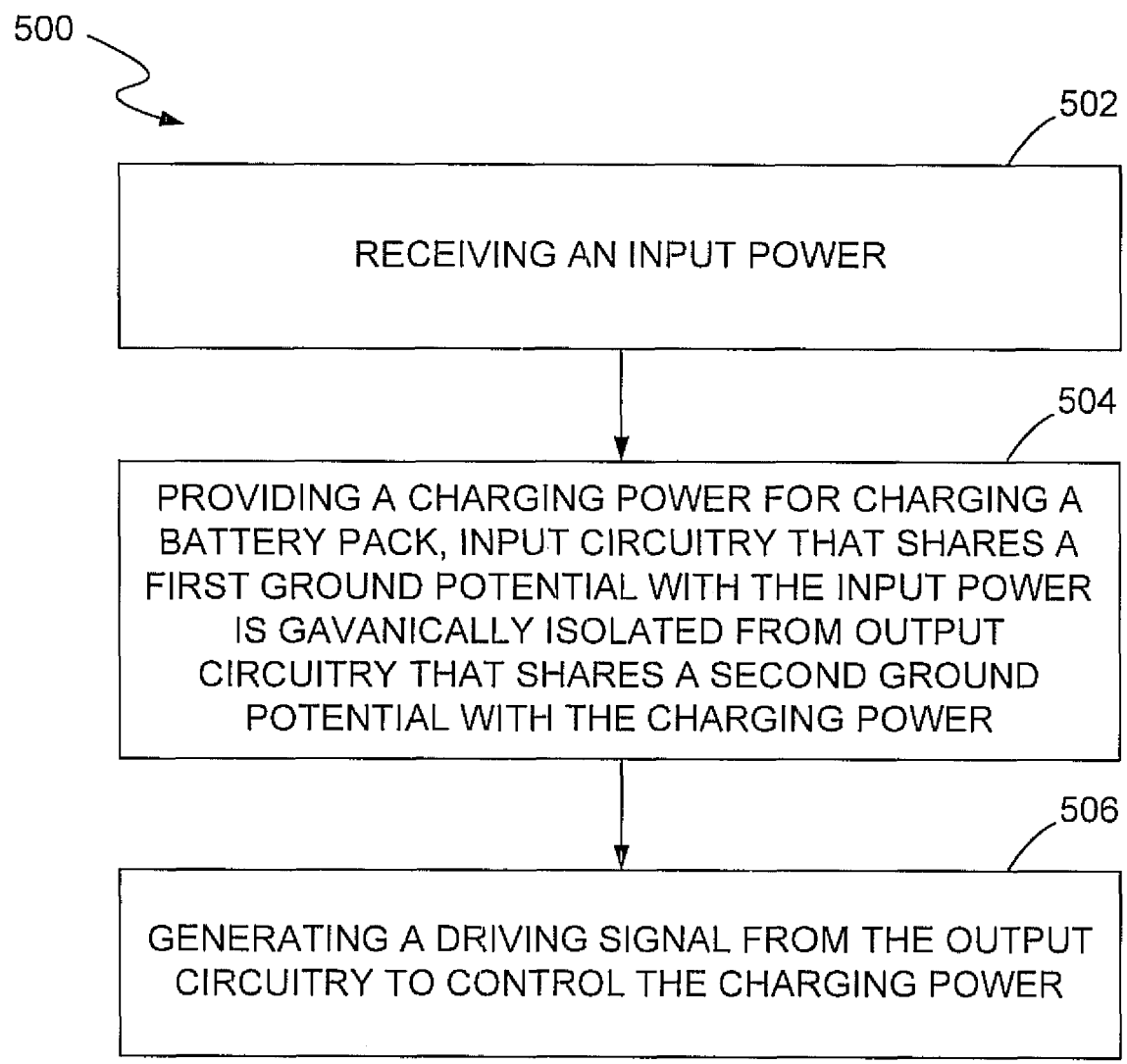
FIG. 5 illustrates a flowchart of operations performed by a charger controller, in accordance with one embodiment of the present invention.

FIG. 5 illustrates a flowchart 500 of operations performed by a battery charging circuit, e.g., the battery charging circuit 200 in FIG. 2, in accordance with one embodiment of the present invention. FIG. 5 is described in combination with FIG. 2, FIG. 3 and FIG. 4. In block 502, an input power, e.g., an AC electrical power 231, is received. In block 504, a charging power, e.g., the charging power 234, is provided for charging a battery pack, e.g., the battery pack 208. Input circuitry, e.g., the input circuitry 202, that shares a first ground potential with the input power is galvanically isolated with output circuitry, e.g., the input circuitry 202, that shares a second ground potential with the charging power. In block 506, a driving signal is generated from the output circuitry to control the charging power.

Accordingly, in one embodiment, a battery charging circuit is provided. Advantageously, the charger controller in the output circuitry of the battery charging circuit can sense the charging voltage signal, the charging current signal and the battery status signals directly to enhance the accuracy of the charging system. Moreover, the pulse width modulator, the state machine, and the protection circuitry can be integrated on an integrated circuit chip to reduce the cost. Advantageously, the state machine can store predetermined charging statuses which may indicate saturation of the transformer mode to avoid the saturation issue if the status of the battery pack matches one of the predetermined charging statuses.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for charging a battery pack, said circuit comprising:
 a power converter operable for receiving an input power, and for providing a charging power for charging said battery pack, wherein said power converter provides galvanic isolation between input circuitry and output circuitry of said circuit, wherein said input circuitry shares a first ground potential with said input power, and wherein said output circuitry shares a second ground potential with said charging power; and
 a charger controller integrated on an integrated circuit (IC) chip in said output circuitry, comprising:
  a state machine operable for monitoring the status of said battery pack and for selecting a charging mode suitable for said battery pack according to said status; and
  a modulator operable for generating a driving signal according to said charging mode, wherein said driving signal is transferred from said output circuitry to a switch of said power converter in said input circuitry to control said charging power.

2. The circuit as claimed in claim 1, wherein said driving signal is a pulse width modulation signal.

3. The circuit as claimed in claim 1, further comprising:
 a pulse transformer coupled between said input circuitry and said charger controller and operable for transferring said driving signal to said input circuitry.

4. The circuit as claimed in claim 1, wherein said state machine is further operable for storing a plurality of predetermined battery statuses which are useful for identifying saturation of said power converter, and switching the charging mode to a protection mode if the status of said battery pack matches a status of said predetermined battery statuses.

5. The circuit as claimed in claim 1, wherein said charger controller comprises protection circuitry operable for monitoring the status of said battery pack and for generating an alert signal based on a result of said monitoring, wherein said pulse width modulator is capable of limiting said charging power in response to said alert signal.

6. The circuit as claimed in claim 1, wherein said power converter comprises a flyback direct current to direct current converter.

7. The circuit as claimed in claim 1, wherein said charger controller comprises at least one communication interface coupled to said battery pack operable for transferring a plurality of signals indicative of battery statuses of said battery pack to said charger controller.

8. An integrated circuit chip comprising a charger controller for driving and controlling a circuit for charging a battery pack, said charger controller comprising:
 circuitry operable for implementing a state machine, said state machine operable for monitoring a status of said battery pack and for selecting a charging mode suitable for said battery pack according to said status; and
 a modulator coupled to said state machine and operable for generating a driving signal to drive said circuit, and for controlling said driving signal to control a charging power for charging said battery pack according to said charging mode.

9. The integrated circuit chip as claimed in claim 8, wherein said charger controller further comprises protection circuitry operable for monitoring said status, and operable for generating an alert signal based on a result of said monitoring, wherein said state machine selects a protection mode in response to said alert signal.

10. The integrated circuit chip as claimed in claim 8, wherein said driving signal is a pulse width modulation signal.

11. The integrated circuit chip as claimed in claim 8, wherein said state machine is further capable of storing a plurality of predetermined battery statuses which are useful for identifying saturation of a power converter, and switching the charging mode to a protection mode if the status of said battery pack matches a status of said predetermined battery statuses.

12. The integrated circuit chip as claimed in claim 8, further comprising:
 at least one communication interface coupled to said battery pack and operable for transferring a plurality of signals indicative of battery statuses to said charger controller.

13. A method for charging a battery pack, said method comprising:
 receiving an input power;
 providing a charging power for charging said battery pack, wherein input circuitry that shares a first ground potential with said input power is galvanically isolated from output circuitry that shares a second ground potential with said charging power;
 generating a driving signal from said output circuitry to control said charging power;

selecting a charging mode suitable for said battery pack according to a status of said battery pack;

controlling said charging power according to said charging mode;

accessing a plurality of predetermined battery statuses which are useful for identifying saturation of a power converter; and switching said charging mode to a protection mode if said status of said battery pack matches a status of said predetermined battery statuses.

14. The method as claimed in claim 13, wherein said driving signal is a pulse width modulation signal.

15. The method as claimed in claim 13, further comprising: transferring said driving signal to said input circuitry.

16. The method as claimed in claim 13, further comprising:

generating an alert signal if said status of said battery pack undergoes an undesirable or abnormal condition; and controlling said charging power according to said alert signal.

17. A circuit for charging a battery pack, said circuit comprising:

a power converter operable for receiving an input power, and for providing a charging power for charging said battery pack, wherein said power converter provides galvanic isolation between input circuitry and output circuitry of said circuit, wherein said input circuitry shares a first ground potential with said input power, and wherein said output circuitry shares a second ground potential with said charging power;

a first switch coupled between said power converter and said battery pack, and operable for transferring said charging power to said battery pack; and a charger controller integrated on an integrated circuit (IC) chip in said output circuitry, operable for monitoring the status of said battery pack, for selecting a charging mode suitable for said battery pack according to said status, for generating a driving signal according to said charging mode, wherein said driving signal is transferred from said output circuitry to a second switch of said power converter in said input circuitry to control said charging power, and for generating a switch control signal to control said first switch.

18. The circuit as claimed in claim 17, wherein said driving signal is a pulse width modulation signal.

19. The circuit as claimed in claim 17, wherein said charger controller comprises protection circuitry for monitoring said status, and operable for generating an alert signal based on a result of said monitoring, wherein said charger controller selects a protection mode in response to said alert signal.

20. The circuit as claimed in claim 17, wherein said charger controller comprises a state machine, wherein said state machine is further capable of storing a plurality of predetermined battery statuses which are useful for identifying saturation of a power converter, and switching the charging mode to a protection mode if the status of said battery pack matches a status of said predetermined battery statuses.

* * * * *